(12) United States Patent
Bledsoe

(10) Patent No.: US 9,082,187 B1  
(45) Date of Patent: *Jul. 14, 2015

(54) METHOD AND APPARATUS FOR CORRECTING DISTORTION IN AN IMAGE DUE TO ROTATIONAL MOTION OF AN IMAGE CAPTURE DEVICE OCCURRING WHILE THE IMAGE IS BEING CAPTURED

(71) Applicant: Marvell International Ltd., Hamilton (BM)

(72) Inventor: James Daren Bledsoe, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,242

(22) Filed: Jun. 2, 2014

Related U.S. Application Data

(63) Continuation of application No. 13/180,813, filed on Jul. 12, 2011, now Pat. No. 8,743,219.

(60) Provisional application No. 61/363,913, filed on Jul. 13, 2010.

(51) Int. Cl.
- *H04N 5/225* (2006.01)
- *G06T 5/00* (2006.01)
- *H04N 5/232* (2006.01)

(52) U.S. Cl.  
CPC ............ *G06T 5/006* (2013.01); *H04N 5/23258* (2013.01)

(58) Field of Classification Search  
CPC .................................................. H04N 5/23238  
USPC .......................................... 348/208.1–208.11  
See application file for complete search history.

(56) References Cited

U.S. PATENT DOCUMENTS

| | | | |
|---|---|---|---|
| 6,992,700 B1 | 1/2006 | Sato et al. | |
| 7,796,872 B2 | 9/2010 | Sachs et al. | |
| 8,743,219 B1 * | 6/2014 | Bledsoe | 348/208.4 |

(Continued)

FOREIGN PATENT DOCUMENTS

WO WO-2009060624 5/2009

OTHER PUBLICATIONS

Wikipedia; Transformation matrix; http://en.wikipedia.org/wiki/Transformation_matrix; 2010; 6 pages.

(Continued)

*Primary Examiner* — Twyler Haskins  
*Assistant Examiner* — Dwight C Tejano

(57) ABSTRACT

A system is operable to correct for distortion in an image. The distortion in the image was caused by rotation of an image capture device while the image was being captured by the image capture device. The system includes an orientation sensor configured to perform a first measurement concurrently with the image capture device capturing the image. The system further includes a rotation module configured to generate, based on the first measurement, a rotation matrix. The system further includes a correction module configured to, based on the rotation matrix, correct the distortion in the image caused by the rotation of the image capture device. The system further includes a restoration module configured to selectively reverse the correction of the distortion in the image based on (i) the image as corrected by the correction module and (ii) the rotation matrix.

23 Claims, 5 Drawing Sheets

(56) References Cited

U.S. PATENT DOCUMENTS

| | | |
|---|---|---|
| 2002/0163581 A1 | 11/2002 | Kitazawa et al. |
| 2003/0002746 A1 | 1/2003 | Kusaka |
| 2006/0197843 A1 | 9/2006 | Yoshimatsu |
| 2007/0263995 A1* | 11/2007 | Park et al. .................. 396/50 |
| 2007/0291114 A1 | 12/2007 | Oshima |
| 2008/0012947 A1 | 1/2008 | Uenaka |
| 2009/0219402 A1 | 9/2009 | Schneider |
| 2010/0085422 A1* | 4/2010 | Yamashita et al. .......... 348/36 |
| 2010/0245603 A1 | 9/2010 | Hashi et al. |
| 2011/0109755 A1 | 5/2011 | Joshi et al. |
| 2012/0293608 A1* | 11/2012 | Doepke et al. ............... 348/36 |

OTHER PUBLICATIONS

Wikipedia; Perspective control; http://en.wikipedia.org/wiki/Perspective_control; 2002; 4 pages.

Wikipedia; Kalman filter; http://en.wikipedia.org/wiki/Kalman_filter; 2002; 23 pages.

Bolch, Larry N.; Visual Communications; Perspective and Barrell Distortion Correction of Wide-angle Images in Adobe Photoshop; 5 pages.

Wikipedia; Parallax; http://en.wikipedia.org/wiki/Parallax; 2007; 11 pages.

Hendershot, Scott; Thoughts on a Digital Workflow; 15 pages.

Wikipedia; Image stabilization; http://en.wikipedia.org/wiki/Image_stabilization; 2011; 7 pages.

\* cited by examiner

METHOD AND APPARATUS FOR CORRECTING DISTORTION IN AN IMAGE DUE TO ROTATIONAL MOTION OF AN IMAGE CAPTURE DEVICE OCCURRING WHILE THE IMAGE IS BEING CAPTURED

CROSS-REFERENCE TO RELATED APPLICATIONS

This application is a continuation of U.S. patent application Ser. No. 13/180,813 (now U.S. Pat. No. 8,743,219), filed on Jul. 12, 2011, which claims the benefit of U.S. Provisional Patent Application No. 61/363,913, filed on Jul. 13, 2010, entitled "NOVEL APPROACH TO IMPROVE THE IMAGE CAPTURE OUTCOME THROUGH THE USE OF ACCELEROMETERS, GYROS AND THE DIRECTION COSINE MATRIX TRANSFORMS." The entire disclosures of the applications referenced above are incorporated herein by reference.

FIELD

The present disclosure relates generally to the field of image capture. More particularly, the present disclosure relates to image capture and correction.

BACKGROUND

When capturing 2D images using a hand-held device such as a camera or cell phone, distortions can be introduced into the 2D image based on the angle of the image capture sensor relative to a 3D object being captured. FIGS. 1A and 1B show a 3D object 102 and a camera 104 for capturing a 2D image of 3D object 102. In FIG. 1A, camera 104 is aligned with 3D object 102. However, in FIG. 1B, camera 104 has rotated in the X-Y plane by an angle θ with respect to 3D object 102, resulting in distortions in the captured image. These distortions can include absolute distortions such as perspective distortion, parallax distortion, and the like, as well as relative distortions between images such as frames of video, images to be stitched together to form a panorama, and the like.

SUMMARY

In general, in one aspect, an embodiment features an apparatus comprising: an image capture sensor configured to capture an image; a plurality of orientation sensors configured to provide measurements of an orientation of the image capture sensor relative to a reference orientation; a rotation module configured to generate a rotation matrix based on the measurements of the orientation of the image capture sensor; and a correction module to generate a corrected image based on the image and the rotation matrix.

Embodiments of the apparatus can include one or more of the following features. In some embodiments, the orientation sensors comprise at least one of: a plurality of accelerometers each configured to provide a respective change of a respective angle of the image capture sensor about a respective axis, wherein the rotation module is further configured to provide the rotation matrix based on the changes of the angles; and a plurality of gyroscopes each configured to provide a respective rate of change of a respective one of the angles about a respective one of the axes, wherein the rotation module is further configured to provide the rotation matrix based on the rates of change of the angles. In some embodiments, the rotation matrix represent a rotational difference between the orientation of the image capture sensor during capture of the image and the reference orientation. In some embodiments, the rotation matrix is a direction cosine matrix. Some embodiments comprise a restoration module to restore the image based on the corrected image and the rotation matrix. Some embodiments comprise a display module, wherein the display module is configured to display the corrected image and an option for causing the restoration module to restore the image. Some embodiments comprise a hand-held device comprising the apparatus. In some embodiments, the hand-held device comprises at least one of: a digital camera; a video camera; a tablet; and a smartphone. Some embodiments comprise an integrated circuit, wherein the integrated circuit includes the rotation module, and the correction module. In some embodiments, the reference orientation represents the orientation of the image capture sensor during capture of a reference image. In some embodiments, the image, and the reference image, are part of a panorama. In some embodiments, the image, and the reference image, are frames in a video. Some embodiments comprise a storage module configured to store an image file, wherein the image file includes the corrected image and at least one of the rotation matrix, and correction coefficients derived from the rotation matrix. Some embodiments comprise a feedback module configured to improve values in the rotation matrix using the measurements of the orientation of the image capture sensor relative to the reference orientation.

In general, in one aspect, an embodiment features a method comprising: capturing an image with an image capture sensor; providing measurements of an orientation of the image capture sensor relative to a reference orientation; generating a rotation matrix based on the measurements of the orientation of the image capture sensor; and generating a corrected image based on the image and the rotation matrix.

Embodiments of the method can include one or more of the following features. In some embodiments, providing measurements of the orientation of the image capture sensor comprises at least one of: providing a respective change of a respective angle of the image capture sensor about a respective axis, wherein the rotation matrix is based on the changes of the angles; and providing a respective rate of change of a respective one of the angles about a respective one of the axes, wherein the rotation matrix is based on the rates of change of the angles. In some embodiments, the rotation matrix represent a rotational difference between the orientation of the image capture sensor during capture of the image and the reference orientation. In some embodiments, the reference orientation represents an orientation of the image capture sensor during capture of a prior image. In some embodiments, the rotation matrix is a direction cosine matrix. Some embodiments comprise restoring the image based on the corrected image and the rotation matrix.

The details of one or more implementations are set forth in the accompanying drawings and the description below. Other features will be apparent from the description and drawings, and from the claims.

Figure 1A:
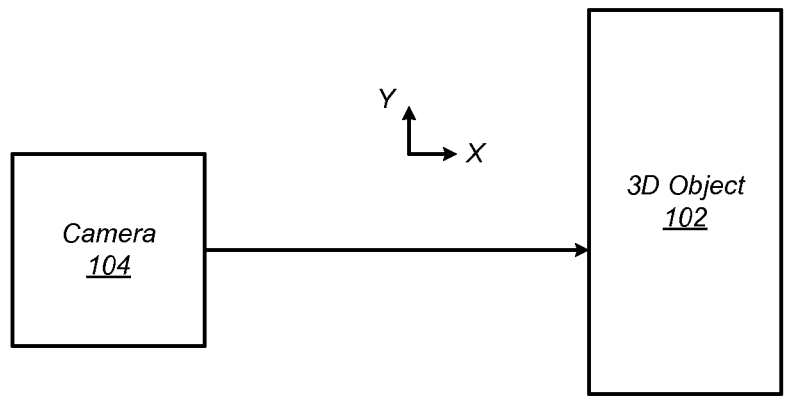
FIGS. 1A and 1B show a 3D object and a camera for capturing a 2D image of the 3D object.

The leading digit(s) of each reference numeral used in this specification indicates the number of the drawing in which the reference numeral first appears.

DETAILED DESCRIPTION

Embodiments of the present disclosure provide image capture, correction, and restoration based on the relative change in the orientation of the image capture sensor relative to a reference orientation. Modern hand-held or mobile devices such as cell phones, digital cameras, video cameras, tablets, and other image capture capable devices include, or can include, integrated 2-axis or 3-axis gyroscopes, 2-axis or 3-axis accelerometers, compass, and the like that can obtain orientation and relative change of orientation measurements. These hand-held or mobile devices also have sufficient computing power to perform the computational corrections for the image capture, correction, and restoration techniques described herein.

The described techniques provide improved image capture quality. One example use is to improve perspective and parallax issues associated with single or multiple images captured from a conference white board to create a higher quality image. Another example use is to correct architectural images captured where perspective distortion has been introduced given the tilt angle of the capture device, resulting in an image that does not correctly reflect the object's perspective.

Figure 2:
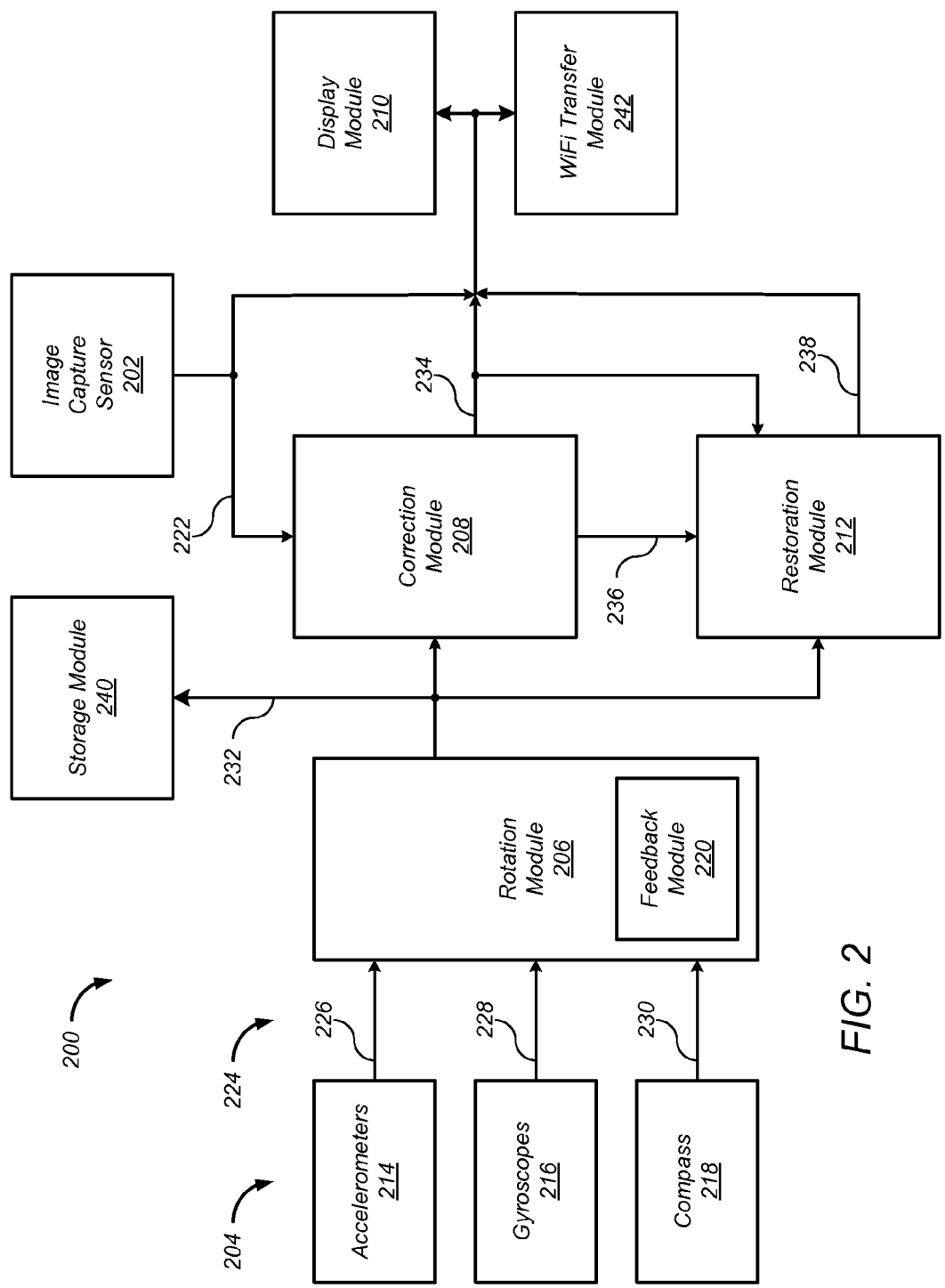
FIG. 2 shows elements of an imaging system according to one embodiment.

FIG. 2 shows elements of an imaging system 200 according to one embodiment. Although in the described embodiments the elements of imaging system 200 are presented in one arrangement, other embodiments may feature other arrangements. For example, elements of imaging system 200 can be implemented in hardware, software, or combinations thereof. Imaging system 200 can be implemented in a hand-held or mobile device such as a digital camera, video camera, smartphone, tablet, or the like.

Referring to FIG. 2, imaging system 200 includes one or more image capture sensors 202, a plurality of orientation sensors 204, a rotation module 206, a correction module 208, a display module 210, and a storage module 240. Some embodiments also include a restoration module 212 and/or a WiFi transfer module 242. Image capture sensor 202 can be implemented as a charge-coupled device (CCD), a complementary metal-oxide-semiconductor (CMOS) active pixel sensor, or the like. Orientation sensors 204 can include multiple (X,Y,Z) accelerometers 214, multiple (X,Y,Z) gyroscopes 216, a compass 218, and the like. Rotation module 206, correction module 208, and restoration module 212 can be implemented in any manner capable of performing the functions described herein, for example as digital circuitry, as an integrated circuit, as one or more processors with software, or any combination thereof. Display module 210 includes a display screen such as a liquid crystal display (LCD) screen or the like, and includes any circuitry necessary to operate the display screen. Orientation sensors 204 and WiFi transfer module 242 can be implemented using off-the-shelf components. Rotation module 206 can include a feedback module 220.

Image capture sensors 202 capture an image 222 of an object. Orientation sensors 204 sense the orientation of image capture sensor 202 relative to a reference orientation. Rotation module 206 generates a rotation matrix based on the orientation of image capture sensor 202. Correction module 208 generates a corrected image 234 based on image 222 and the rotation matrix. For example, correction module 208 can calculate correction coefficients 236, and use those correction coefficients 236 to mathematically correct captured image 222. Storage module 240 stores image 222 and corrected image 234, along with correction coefficients 236. Restoration module 212 restores image 222 based on corrected image 234 and the rotation matrix. For example, restoration module 208 can use correction coefficients 236 to restore image 222. Display module 210 can display captured image 222 and corrected image 234. WiFi transfer module 242 can transfer captured image 222 and corrected image 234 to other devices for storage and/or display.

Figure 3:
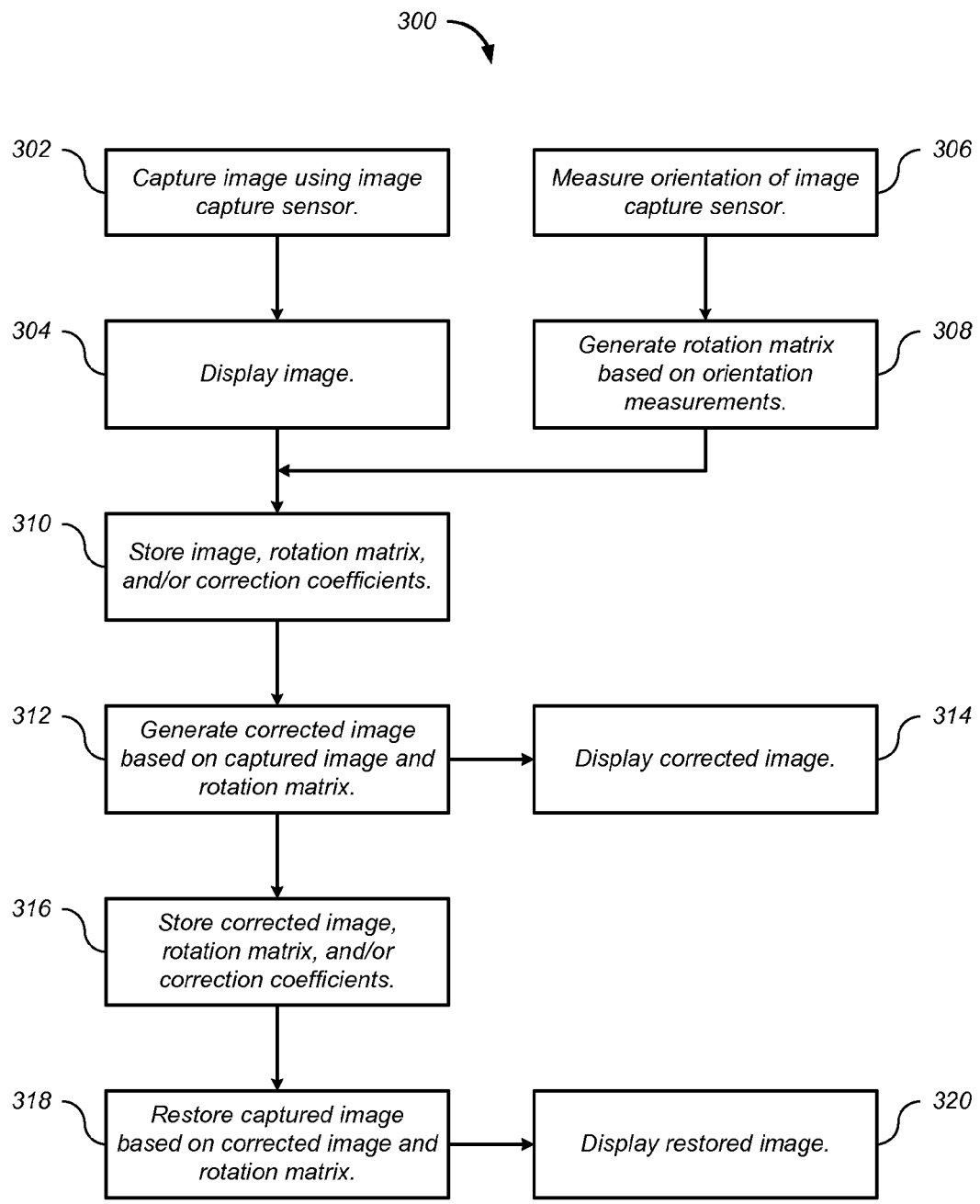
FIG. 3 shows a process for the imaging system of FIG. 1 according to one embodiment.

FIG. 3 shows a process 300 for imaging system 200 of FIG. 2 according to one embodiment. Although in the described embodiments the elements of process 300 are presented in one arrangement, other embodiments may feature other arrangements. For example, in various embodiments, some or all of the elements of process 300 can be executed in a different order, concurrently, and the like. As further examples, some elements of process 300 may not be performed, or may not be executed immediately after each other.

Referring to FIG. 3, at 302 image capture sensor 202 captures an image 222 of an object. Image capture sensor 202 provides image 222 to display module 210 for display, and to correction module 208 for correction. At 304 display module 210 displays image 222. In some embodiments, WiFi transfer module 242 transfers image 222 over a WiFi connection to another device for display and/or storage.

Figure 4:
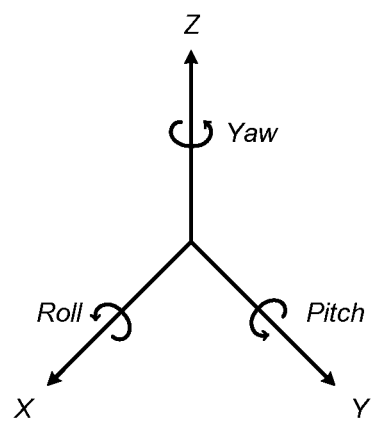
FIG. 4 shows the relationship between roll, pitch and yaw and the X, Y and Z axes.

Concurrently with image capture, at 306 orientation sensors 204 measure the orientation of image capture sensor 202 relative to a reference orientation, and provide the measurements 224 to rotation module 206. For example, each accelerometer 214 provides a respective change 226 of a respective angle of image capture sensor 202 about a respective axis, and each gyroscope provides a respective rate of change 228 of a respective one of the angles about a respective one of the axes. For example, the changes of angle can represent roll, pitch and yaw, and the rates of change can represent roll rate, pitch rate and yaw rate. As another example, compass 218 provides a compass heading 230. FIG. 4 shows the relationship between roll, pitch and yaw and the X, Y and Z axes.

At 308 rotation module 206 generates a rotation matrix 232 based on orientation measurements 224 at a specific reference time point, and provides rotation matrix 232 to correction module 208 related to this time point. For example, rotation matrix 232 can be generated based on angular changes 226, angular rates of change 228, compass heading 230, or any combination thereof, for that reference time point. A rotation matrix 232 is a transformation matrix that can be used to transform one coordinate reference frame to another. For example, the rotation of camera 104 through angle θ shown in FIG. 1B can be represented by the rotation matrix R(θ) of equation (1).

$$R(\theta) = \begin{bmatrix} \cos\theta & -\sin\theta \\ \sin\theta & \cos\theta \end{bmatrix} \quad (1)$$

Rotation matrix R(θ) can be used to rotate column vectors using matrix multiplication, as shown in equation (2).

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix} \quad (2)$$

The coordinates (x', y') of the point (x, y) after rotation are given by equations (3) and (4).

$$x' = x \cos\theta - y \sin\theta \quad (3)$$

$$y' = x \sin\theta + y \cos\theta \quad (4)$$

Figure 1B:
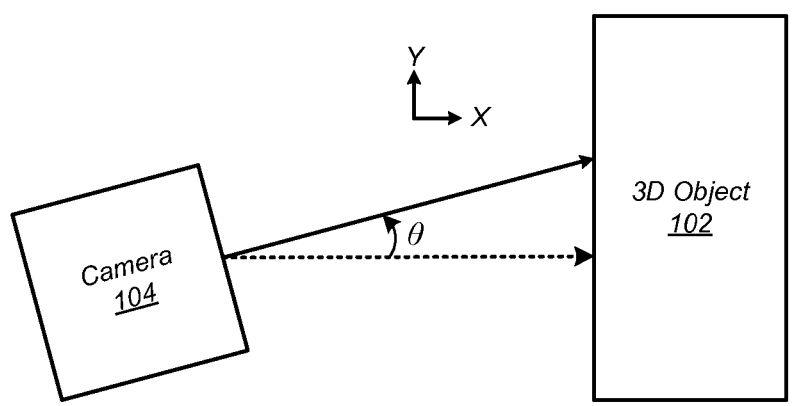

The example of FIG. 1 and equations (1)-(4) is easily extended to 3D.

In some embodiments, rotation matrix 232 represents a rotational difference between the orientation of image capture sensor 202 during capture of image 222 and a reference orientation. In some embodiments, the reference orientation includes the gravity vector. In some embodiments, the reference orientation represents an orientation of image capture sensor 202 during capture of a prior image 222. In some embodiments, rotation matrix 232 is implemented as a direction cosine matrix.

Some embodiments include a feedback module 220 to improve the values in rotation matrix 232 using orientation measurements 224. The values can be improved based on current orientation measurements 224, past orientation measurements 224, predicted orientation measurements 224, or any combination thereof. In some embodiments, feedback module 220 employs Kalman filter techniques to improve the values in rotation matrix 232. Certain types of orientation measurements 224 can be used to correct errors in other types of orientation measurements 224. For example, drift in pitch and roll gyroscopes 216 can be corrected using measurements 224 of the gravity vector obtained by accelerometers 214. As another example, drift in a yaw gyroscope 216 can be corrected using compass headings 230. As another example, the values of rotation matrix 232 can be used to correct for yaw motion.

Figure 5:
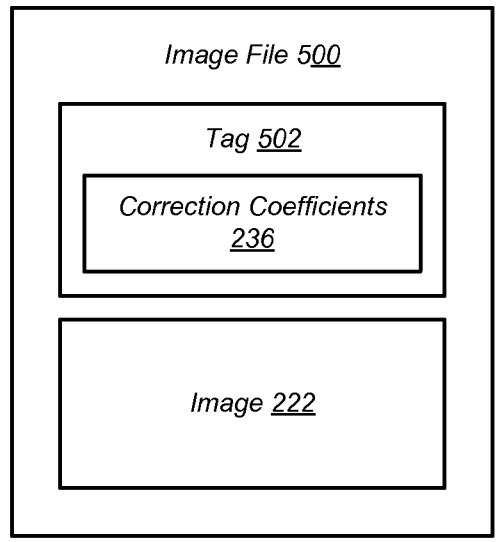
FIG. 5 depicts an image file for a captured image according to one embodiment.

In some embodiments, at 310 rotation matrix 232 and/or correction coefficients 236 derived from rotation matrix 232 are stored in storage module 240, for example to support post processing. Correction coefficients 236 can be stored with captured image 222, for example as a tag. FIG. 5 depicts an image file 500 for a captured image 222 according to one embodiment. Referring to FIG. 5, file 500 includes image 222 and a tag 502 that includes the correction coefficients 236 for image 222.

Referring again to FIG. 3, at 312 correction module 208 generates a corrected image 234 based on captured image 222 and rotation matrix 232. For example, correction module 208 can calculate correction coefficients 236 such as pitch and roll correction coefficients and the like, and use those correction coefficients 236 to mathematically correct captured image 222. In some embodiments, corrected image 234 is generated at the time of image capture. In other embodiments, rotation matrix 232 and/or correction coefficients 236 are stored in storage module 240, and corrected image 234 is generated at a later time. At 314 display module 210 displays corrected image 234. In some embodiments, WiFi transfer module 242 transfers corrected image 234 and/or correction coefficients 236 over a WiFi connection to another device for display, storage, post processing, and the like.

Figure 6:
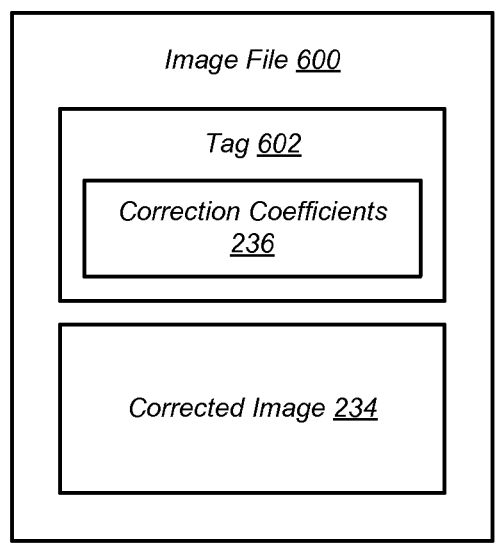
FIG. 6 depicts an image file for a corrected image according to one embodiment.

In some embodiments, at 316 rotation matrix 232 and/or correction coefficients 236 are stored in storage module 240 with corrected image 234, for example to support post processing. FIG. 6 depicts an image file 600 for a corrected image 234 according to one embodiment. Referring to FIG. 6, file 600 includes corrected image 234 and a tag 602 that includes the correction coefficients 236 for corrected image 234.

After viewing corrected image 234, a user may wish to restore the original captured image 222, that is, to reverse the corrections. In such embodiments, display module 210 displays corrected image 234 and an option for causing restoration module 212 to restoring the image. In some embodiments, imaging system 200 can restore the captured image 222 based on the corrected image 234, rotation matrix 232 and/or correction coefficients 236. In such embodiments, storage module 240 provides stored corrected image 234, rotation matrix 232 and/or correction coefficients 236 to restoration module 212. At 318 restoration module 212 uses rotation matrix 232 and/or correction coefficients 236 to mathematically restore the captured image 222 based on the corrected image 234, resulting in restored image 238. At 320 display module 210 displays restored image 238. In some embodiments, WiFi transfer module 242 transfers restored image 238 over a WiFi connection to another device for display and/or storage.

Various embodiments can be used to correct distortions including absolute distortions such as perspective distortion, parallax distortion, and the like, as well as relative distortions between images such as frames of video, images to be stitched together to form a panorama, and the like. For example, when creating a panorama, multiple images are stitched together to form a large, seamless composite image. However, the orientation of the camera may differ for each image. In such cases, each image can be corrected relative to the same reference orientation, for example the gravity vector. Alternatively, one of the images can be selected as a reference image, and the other images can be corrected relative to the orientation of the camera during capture of the reference image. The same principles apply to video, where the frames of a video can be corrected relative to the same reference orientation, or relative to the orientation of the camera during capture of a chosen reference frame.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. A system operable to correct for distortion in a captured image, the distortion in the captured image having been caused by a rotation of an image capture device while the captured image was being captured by the image capture device, the system comprising:
    an orientation sensor configured to perform a first measurement concurrently with the image capture device capturing the captured image;
    a rotation module configured to generate, based on the first measurement, a rotation matrix;
    a correction module configured to, based on the rotation matrix, produce a corrected image by correcting the distortion in the captured image caused by the rotation of the image capture device; and
    a restoration module configured to selectively revert the corrected image back to the captured image based on (i) the corrected image and (ii) the rotation matrix.

2. The system of claim 1, further comprising a storage module configured to store an image file, wherein the image file includes the corrected image and at least one of (i) the rotation matrix and (ii) correction coefficients derived from the rotation matrix.

3. The system of claim 1, further comprising an image capture sensor, wherein the captured image is captured by the image capture sensor.

4. The system of claim 3, wherein the rotation matrix represents a rotational difference between (i) an orientation of the image capture sensor during capture of the captured image and (ii) a reference orientation.

5. The system of claim 4, wherein the reference orientation corresponds to a gravity vector.

6. The system of claim 4, wherein the first measurement corresponds to the orientation of the image capture sensor during capture of the captured image.

7. The system of claim 4, wherein the reference orientation represents an orientation of the image capture sensor during capture of a reference image.

8. The system of claim 7, wherein the captured image and the reference image are part of a panorama.

9. The system of claim 7, wherein the captured image and the reference image are frames in a video.

10. The system of claim 1, further comprising:
    an accelerometer configured to perform a second measurement concurrently with the image capture device capturing the captured image; and
    a feedback module configured to, based on the second measurement, transform the first measurement into a corrected first measurement to correct for drift of the orientation sensor,
    wherein the rotation module is configured to generate the rotation matrix based on the corrected first measurement.

11. The system of claim 10, wherein the orientation sensor comprises a gyroscope.

12. The system of claim 1, wherein the rotation matrix includes a direction cosine matrix.

13. The system of claim 1, further comprising a display module, wherein the display module is configured to display
    (i) the corrected image, and
    (ii) a control allowing a user to direct the restoration module to revert the corrected image to the captured image.

14. A method for correcting distortion in a captured image, the distortion in the captured image having been caused by a rotation of an image capture device while the captured image was being captured by the image capture device, the method comprising:
    performing a first measurement using an orientation sensor concurrently with the captured image being captured;
    generating, based on the first measurement, a rotation matrix;
    producing a corrected image by correcting, based on the rotation matrix, the distortion in the captured image caused by the rotation of the image capture device; and
    selectively reverting the corrected image back to the captured image based on (i) the corrected image and (ii) the rotation matrix.

15. The method of claim 14, further comprising storing an image file, wherein the image file includes the corrected image and at least one of (i) the rotation matrix and (ii) correction coefficients derived from the rotation matrix.

16. The method of claim 14, wherein the rotation matrix represents a rotational difference between (i) an orientation of the image capture device during capture of the captured image and (ii) a reference orientation.

17. The method of claim 16, wherein the reference orientation corresponds to a gravity vector.

18. The method of claim 16, wherein the first measurement corresponds to the orientation of the image capture device during capture of the captured image.

19. The method of claim 16, wherein the reference orientation represents an orientation of the image capture device during capture of a reference image.

20. The method of claim 19, wherein the captured image and the reference image are part of a panorama.

21. The method of claim 19, wherein the captured image and the reference image are frames in a video.

22. The method of claim 14, further comprising:
    performing a second measurement using an accelerometer concurrently with the image capture device capturing the captured image; and
    based on the second measurement, transforming the first measurement into a corrected first measurement to correct for drift of the orientation sensor,
    wherein the orientation sensor comprises a gyroscope, and
    wherein the rotation matrix is generated based on the corrected first measurement.

23. The method of claim 14, wherein the rotation matrix includes a direction cosine matrix.

* * * * *